(12) United States Patent
Mizushima

(10) Patent No.: US 11,654,725 B2
(45) Date of Patent: May 23, 2023

(54) PNEUMATIC TIRE

(71) Applicant: The Yokohama Rubber Co., LTD., Tokyo (JP)

(72) Inventor: Haruna Mizushima, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 208 days.

(21) Appl. No.: 16/966,421

(22) PCT Filed: Jan. 30, 2019

(86) PCT No.: PCT/JP2019/003194
§ 371 (c)(1),
(2) Date: Jul. 30, 2020

(87) PCT Pub. No.: WO2019/151333
PCT Pub. Date: Aug. 8, 2019

(65) Prior Publication Data
US 2021/0039447 A1 Feb. 11, 2021

(30) Foreign Application Priority Data

Jan. 30, 2018 (JP) ............................. JP2018-014169
Jan. 30, 2018 (JP) ............................. JP2018-014184
(Continued)

(51) Int. Cl.
*B60C 11/13* (2006.01)
*B60C 11/03* (2006.01)

(52) U.S. Cl.
CPC ...... *B60C 11/1323* (2013.01); *B60C 11/0304* (2013.01); *B60C 11/1392* (2013.01);
(Continued)

(58) Field of Classification Search
CPC ............ B60C 11/0304; B60C 11/0306; B60C 11/0309; B60C 11/042; B60C 11/045;
(Continued)

(56) References Cited

U.S. PATENT DOCUMENTS 5,420,170 A  5/1995 Lutter et al.
8,210,219 B2  7/2012 Iwai
(Continued)

FOREIGN PATENT DOCUMENTS

JP  H4-117417  4/1992
JP  2008-126931  6/2008
(Continued)

OTHER PUBLICATIONS

International Search Report for International Application No. PCT/JP2019/003194 dated Apr. 23, 2019, 3 pages, Japan.
(Continued)

*Primary Examiner* — Robert C Dye
(74) *Attorney, Agent, or Firm* — Thorpe North & Western

(57) ABSTRACT

In a pneumatic tire, an inner second land portion includes chamfered portions and lug grooves. The chamfered portions are on an edge portion on a tire ground contact edge side of the inner second land portion and widen chamfer widths on a road contact surface of the inner second land portion in a tire circumferential direction. The lug grooves terminate in the inner second land portion at one end portion and open to central portions in a longitudinal direction of the chamfered portions at another end portion. An outer second land portion and an outer shoulder land portion include closed lug grooves terminating in the outer second land portion at one end portion. The closed lug grooves extend in the tire width direction and penetrate a circumferential
(Continued)

narrow groove. The closed lug grooves terminate in a ground contact surface of the outer shoulder land portion at another end portion.

15 Claims, 10 Drawing Sheets

(30) Foreign Application Priority Data

Jul. 3, 2018 (JP) .............................. JP2018-127005
Oct. 4, 2018 (JP) .............................. JP2018-189107

(52) U.S. Cl.
CPC ................. *B60C 2011/0348* (2013.01); *B60C 2011/0381* (2013.01)

(58) Field of Classification Search
CPC ............. B60C 11/1315; B60C 11/1323; B60C 11/1384; B60C 11/1392; B60C 2011/0381; B60C 2011/133
See application file for complete search history.

(56) References Cited

U.S. PATENT DOCUMENTS

| | | | |
|---|---|---|---|
| 9,085,201 B2 | 7/2015 | Horiguchi | |
| 9,346,323 B2* | 5/2016 | Sakamoto | B60C 11/0304 |
| 9,505,272 B2 | 11/2016 | Chambriard et al. | |
| 9,789,736 B2 | 10/2017 | Munezawa | |
| 2004/0256040 A1* | 12/2004 | Ratliff, Jr. | B60C 11/0306 |
| | | | 152/DIG. 3 |
| 2008/0121326 A1 | 5/2008 | Ohara | |
| 2010/0212792 A1* | 8/2010 | Mita | B60C 11/033 |
| | | | 152/209.9 |
| 2012/0060987 A1 | 3/2012 | Nemoto | |
| 2012/0285592 A1* | 11/2012 | Kameda | B60C 11/033 |
| | | | 152/209.8 |
| 2014/0238568 A1 | 8/2014 | Haga | |
| 2016/0297251 A1* | 10/2016 | Takagi | B60C 11/0306 |
| 2017/0157985 A1 | 6/2017 | Aoki | |
| 2017/0210174 A1* | 7/2017 | Suga | B60C 11/00 |
| 2017/0274708 A1 | 9/2017 | Suzuki et al. | |
| 2017/0305198 A1* | 10/2017 | Ichimura | B60C 11/1236 |

FOREIGN PATENT DOCUMENTS

| | | | |
|---|---|---|---|
| JP | 4755709 | | 8/2011 |
| JP | 2012-056479 | | 3/2012 |
| JP | 2012-81806 | A | 4/2012 |
| JP | 2013-049407 | | 3/2013 |
| JP | 5629283 | | 11/2014 |
| JP | 2015-504808 | A | 2/2015 |
| JP | 2015-047977 | | 3/2015 |
| JP | 2015-134581 | A | 7/2015 |
| JP | 2016-030490 | | 3/2016 |
| JP | 2016-074386 | | 5/2016 |
| JP | 2017-071280 | | 4/2017 |
| JP | 2017-197145 | | 11/2017 |
| WO | WO 2013/137193 | | 9/2013 |
| WO | WO2014/067686 | * | 5/2014 |
| WO | WO2014/167990 | * | 10/2014 |
| WO | WO 2015/093238 | | 6/2015 |
| WO | WO 2016/017149 | | 2/2016 |
| WO | WO 2016/027648 | | 2/2016 |
| WO | WO 2016/056505 | | 4/2016 |

OTHER PUBLICATIONS

Decision to Grant a Patent for Japanese Patent Application No. 2018-014169 dated Apr. 2, 2019, 3 pages, Japan.
Notice of Reasons For Refusal for Japanese Patent Application No. 2018-189107 dated Apr. 23, 2019, 7 pages, Japan.
Notice of Reasons For Refusal for Japanese Patent Application No. 2018-189107 dated Nov. 19, 2019, 5 pages, Japan.
Notice of Reasons For Refusal for Japanese Patent Application No. 2018-189107 dated Jun. 30, 2020, 3 pages, Japan.

* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|---|---|---|---|---|---|
| CHAMFERED PORTION OF INNER SECOND LAND PORTION | NO | YES | YES | YES | YES | YES | YES | YES | YES | YES | YES | YES | YES | YES |
| CLOSED LUG GROOVE PENETRATING CIRCUMFERENTIAL NARROW GROOVE | NO | YES | YES | YES | YES | YES | YES | YES | YES | YES | YES | YES | YES | YES |
| Wc/Wr2 | - | 0.05 | 0.30 | 0.20 | 0.20 | 0.20 | 0.20 | 0.20 | 0.20 | 0.20 | 0.20 | 0.20 | 0.20 | 0.20 |
| Lc/Pc | - | 0.60 | 0.60 | 0.60 | 0.90 | 0.90 | 0.90 | 0.90 | 0.90 | 0.90 | 0.90 | 0.90 | 0.90 | 0.90 |
| D22/Wr2 | 0.30 | 0.30 | 0.30 | 0.30 | 0.30 | 0.30 | 0.30 | 0.30 | 0.30 | 0.30 | 0.30 | 0.30 | 0.30 | 0.30 |
| W22/Lc | - | 0.03 | 0.03 | 0.03 | 0.03 | 0.10 | 0.06 | 0.06 | 0.06 | 0.06 | 0.06 | 0.06 | 0.06 | 0.06 |
| L22/Lc | - | 0.35 | 0.35 | 0.35 | 0.35 | 0.35 | 0.35 | 0.65 | 0.50 | 0.50 | 0.50 | 0.50 | 0.50 | 0.50 |
| Di/Wr4 | - | 0.10 | 0.10 | 0.10 | 0.10 | 0.10 | 0.10 | 0.10 | 0.10 | 0.80 | 0.60 | 0.60 | 0.60 | 0.60 |
| Do/Wr5 | - | 0.30 | 0.30 | 0.30 | 0.30 | 0.30 | 0.30 | 0.30 | 0.30 | 0.30 | 0.30 | 0.60 | 0.60 | 0.60 |
| W41/Ws | - | 0.30 | 0.30 | 0.30 | 0.30 | 0.30 | 0.30 | 0.30 | 0.30 | 0.30 | 0.30 | 0.30 | 1.50 | 0.80 |
| L1_max/L1_min | - | 1.00 | 1.00 | 1.00 | 1.00 | 1.00 | 1.00 | 1.00 | 1.00 | 1.00 | 1.00 | 1.00 | 1.00 | 1.00 |
| DRY STEERING STABILITY PERFORMANCE | 100 | 105 | 102 | 104 | 104 | 102 | 103 | 103 | 103 | 101 | 103 | 101 | 98 | 100 |
| WET STEERING STABILITY PERFORMANCE | 100 | 105 | 110 | 108 | 110 | 113 | 112 | 110 | 114 | 116 | 115 | 117 | 122 | 119 |

FIG. 9

CONVENTIONAL EXAMPLE

PNEUMATIC TIRE

TECHNICAL FIELD

The technology relates to a pneumatic tire, and particularly relates to a pneumatic tire that can provide dry steering stability performance and wet steering stability performance in a compatible manner.

BACKGROUND ART

Recently, it has been requested for pneumatic tires to improve sports performance not only in circuit traveling but also in traveling in an urban area and a highway. Therefore, there is a problem that dry steering stability performance and wet steering stability performance of the tire should be provided in a compatible manner. As pneumatic tires in the related art related to the problem, technologies described in Japan Patent Nos. 4755709 and 5629283 and in Japan Unexamined Patent Publication No. 2016-074386 have been known.

SUMMARY

The technology provides a pneumatic tire that can provide dry steering stability performance and wet steering stability performance of the tire in a compatible manner.

A pneumatic tire according to an embodiment of the technology has a designation of a mounting direction to a vehicle. The pneumatic tire includes an inner side shoulder main groove and an inner side center main groove, an outer side center main groove, a circumferential narrow groove, an inner shoulder land portion and an inner second land portion, and an outer second land portion and an outer shoulder land portion. The inner side shoulder main groove and the inner side center main groove are disposed in a region inner side in a vehicle width direction demarcated by a tire equatorial plane. The outer side center main groove is disposed in a region outer side in the vehicle width direction. The circumferential narrow groove is disposed outward of the outer side center main groove in the vehicle width direction. The inner shoulder land portion and the inner second land portion are defined by the inner side shoulder main groove and the inner side center main groove. The outer second land portion and the outer shoulder land portion are defined by the outer side center main groove and the circumferential narrow groove. The inner second land portion includes chamfered portions and lug grooves. The chamfered portions are formed on an edge portion on a tire ground contact edge side of the inner second land portion. The chamfered portions widen chamfer widths on a road contact surface of the inner second land portion in a tire circumferential direction. The lug grooves terminate in the inner second land portion at one end portions and open to central portions in a longitudinal direction of the chamfered portions at another end portions. The outer second land portion and the outer shoulder land portion include closed lug grooves. The closed lug grooves terminate in the outer second land portion at one end portions. The closed lug grooves extend in the tire width direction and penetrate the circumferential narrow groove. The closed lug grooves terminate in a ground contact surface of the outer shoulder land portion at another end portions.

With the pneumatic tire according to the embodiment of the technology, (1) the inner second land portion includes the chamfered portions and the lug grooves formed on the edge portion on the tire ground contact edge side. Accordingly, drainage properties of the inner second land portion are improved and wet steering stability performance of the tire is improved. Additionally, (2) the lug grooves in the inner second land portion do not penetrate the land portion. Accordingly, rigidity of the inner second land portion is ensured and dry steering stability performance of the tire is ensured. Additionally, (3) the lug grooves in the inner second land portion open to the central portions in the longitudinal direction of the chamfered portions. Accordingly, the drainage properties of the inner second land portion are improved and the wet steering stability performance of the tire is improved. Furthermore, (4) the closed lug grooves in the region outer side in the vehicle width direction penetrating the circumferential narrow groove improve the drainage properties at or near the circumferential narrow groove to improve wet performance of the tire. At the same time, since the closed lug grooves do not open to the circumferential main groove or a tire ground contact edge, rigidity of the left and right land portions defined by the circumferential narrow groove is ensured. These have an advantage that the wet performance and dry performance of the tire are efficiently provided in a compatible manner.

BRIEF DESCRIPTION OF DRAWINGS

FIG. 9 is a table showing results of performance tests of the pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
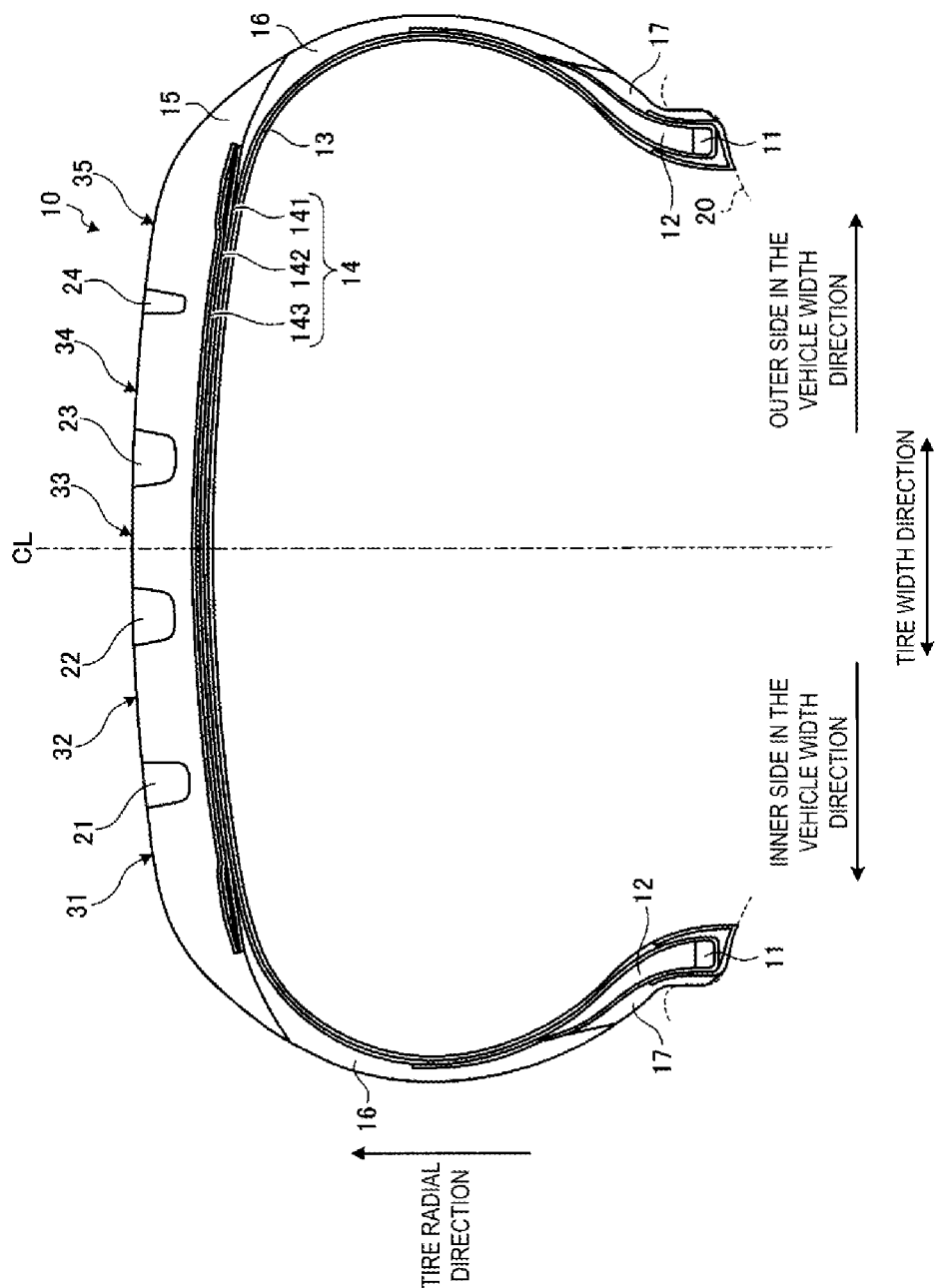
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction.

Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire width direction" refers to the direction parallel with the tire rotation axis. "Tire radial direction" refers to the direction perpendicular to the tire rotation axis.

Furthermore, an inner side in the vehicle width direction and an outer side in the vehicle width direction are defined as directions with respect to the vehicle width direction when the tire is mounted on the vehicle. Additionally, left and right regions demarcated by the tire equatorial plane are defined as the region outer side in the vehicle width direction and the region inner side inner side in the vehicle width direction, respectively. The pneumatic tire includes a mounting direction indicator portion (not illustrated) that indicates a tire mounting direction with respect to the vehicle. The mounting direction indicator portion, for example, is constituted by a mark or ridges/grooves on the sidewall portion of the tire. For example, Economic Commission for Europe Regulation 30 (ECE R30) requires that an indicator portion in the vehicle mounting direction is provided on the sidewall portion outer side in the vehicle width direction when the tire is mounted on the vehicle.

A pneumatic tire 10 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are formed by annularly and multiply winding one or a plurality of bead wires made of steel. The pair of bead cores 11, 11 are embedded in bead portions to constitute cores of the left and right bead portions. The pair of bead fillers 12, 12 are disposed outward of the pair of bead cores 11, 11 in the tire radial direction and reinforce the bead portions.

The carcass layer 13 has a single layer structure made of one carcass ply or a multilayer structure made of a plurality of layered carcass plies, and extends between the left and right bead cores 11, 11 in a toroidal shape, forming the framework of the tire. Additionally, both end portions of the carcass layer 13 are turned back outwardly in the tire width direction so as to wrap around the bead cores 11 and the bead fillers 12 and fixed. The carcass ply (plies) of the carcass layer 13 is made by performing a rolling process on a plurality of coating rubber-covered carcass cords made of steel or an organic fiber material (e.g., aramid, nylon, polyester, rayon, or the like). The carcass ply (plies) has a carcass angle (defined as an inclination angle of a longitudinal direction of the carcass cords with respect to the tire circumferential direction), as an absolute value ranging from 80 degrees to 90 degrees.

The belt layer 14 is a multilayer structure including a pair of cross belts 141, 142 and a belt cover 143 and is disposed around the outer circumference of the carcass layer 13. The pair of cross belts 141, 142 are made by performing a rolling process on coating rubber-covered belt cords made of steel or an organic fiber material. The cross belts 141, 142 have a belt angle, as an absolute value, ranging from 20 degrees to 55 degrees. Furthermore, the pair of cross belts 141, 142 have belt angles (defined as inclination angles of the longitudinal direction of the belt cords with respect to the tire circumferential direction) of mutually different signs, and the cross belts 141, 142 are layered so that the longitudinal directions of the belt cords intersect with one another (so-called crossply structure). The belt cover 143 is made by covering belt cover cords made of steel or an organic fiber material with a coating rubber. The belt cover 143 has a belt angle, as an absolute value, ranging from 0 degrees to 10 degrees. Further, the belt cover 143 is, for example, a strip material formed by covering one or more belt cover cords with a coating rubber and can be formed by winding the strip material spirally around the outer circumferential surface of the cross belts 141, 142 multiple times in the tire circumferential direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire width direction and constitute left and right sidewall portions. The pair of respective rim cushion rubbers 17, 17 are disposed inward of the left and right bead cores 11, 11 and the turned back portions of the carcass layer 13 in the tire radial direction to constitute rim fitting surfaces of the bead portions.

Tread Pattern

Figure 2:
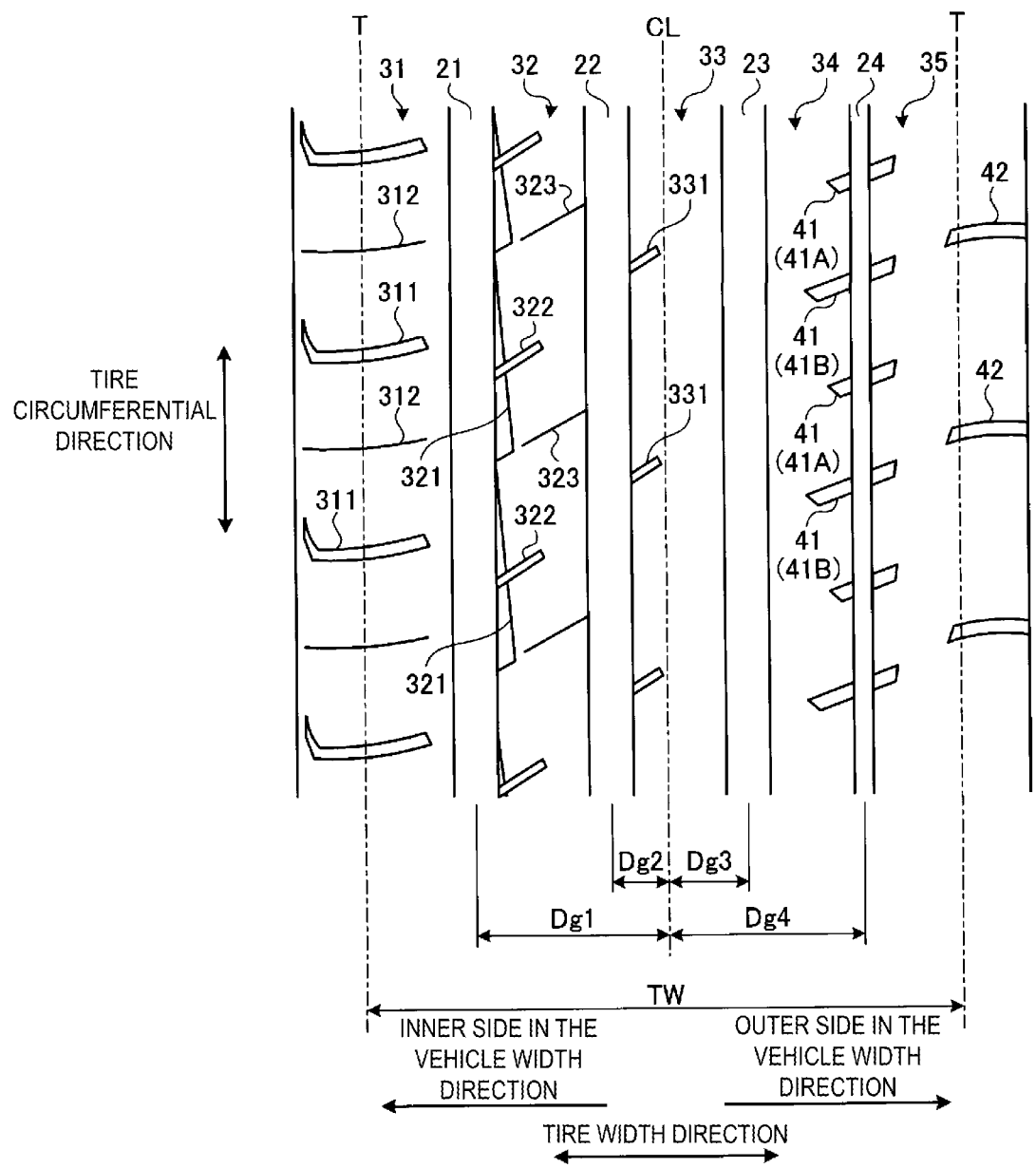
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread pattern of an all-season tire. In reference to the same drawing, "tire circumferential direction" refers to the direction revolving about the tire rotation axis. Reference sign T denotes a tire ground contact edge, and a dimension symbol TW denotes a tire ground contact width.

As illustrated in FIG. 2, the pneumatic tire 10 includes, in the tread surface, a plurality of circumferential main grooves 21 to 23 and a circumferential narrow groove 24 extending in the tire circumferential direction, and a plurality of land portions 31 to 35 defined by the circumferential grooves 21 to 24.

"Main groove" refers to a groove on which a wear indicator must be provided as specified by JATMA (The Japan Automobile Tyre Manufacturers Association, Inc.) and typically has a groove width of 3.0 mm or greater and a groove depth of 6.0 mm or greater. Lug grooves described later are lateral grooves extending in the tire width direction and open when the tire comes into contact with the ground to function as grooves. A sipe described later is a cut formed in a tread contact surface and distinguished from the lug groove in that the sipe closes when the tire comes into contact with the ground.

Note that the circumferential narrow groove 24 will be described later.

The groove width is the maximum distance between the left and right groove walls at the groove opening portion and is measured when the tire is mounted on a specified rim, inflated to the specified internal pressure, and in an unloaded state. In a configuration in which the land portions include notch portions or chamfered portions on edge portions thereof, the groove widths are measured with points where the tread contact surface and extension lines of the groove walls meet as measured points, in a cross-sectional view normal to the groove length direction. Additionally, in a configuration in which the grooves extend in a zigzag-like or wave-like manner in the tire circumferential direction, the groove width is measured with the center line of amplitude of the groove walls as the measured point.

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 10 has a left-right symmetric tread pattern with respect to a tire equatorial plane CL. Additionally, the region inner side in the vehicle width direction demarcated by the tire equatorial plane CL includes two circumferential main grooves 21, 22 and a region outer side in the vehicle width direction includes one circumferential main groove 23 and one circumferential narrow groove 24. These circumferential grooves 21, 22; 23, 24 are disposed being left-right symmetric with respect to the tire equatorial plane CL. Five rows of the land portions 31 to 35 are defined by the circumferential grooves 21 to 24. In addition, one land portion 33 is disposed on the tire equatorial plane CL.

Additionally, the inner side shoulder main groove 21 in the region inner side in the vehicle width direction is defined as an inner side shoulder main groove, and the circumferential main groove 22 adjacent to the inner side shoulder main groove 21 is defined as an inner side center main groove. Additionally, the circumferential main groove 23 in the region outer side in the vehicle width direction is defined as an outer side center main groove.

Moreover, the land portions 31, 35 located outward in the tire width direction defined by the inner side shoulder main groove 21 and the circumferential narrow groove 24 are defined as shoulder land portions. The shoulder land portions 31, 35 are land portions located outermost in the tire width direction and positioned on the tire ground contact edges T. Furthermore, the land portion 32, 34 on the tire equatorial plane CL side defined by the inner side shoulder main groove 21 or the circumferential narrow groove 24 is defined as a second land portion. Accordingly, the second land portion 32, 34 is adjacent to the shoulder land portion 31, 35 with the inner side shoulder main groove 21 or the circumferential narrow groove 24 disposed therebetween. Furthermore, the land portion 33 located closer to the tire equatorial plane CL than the second land portions 32, 34 is defined as a center land portion.

Note that, in the configuration of FIG. 2, the pneumatic tire 10 includes the three circumferential main grooves 21 to 23 and the single circumferential narrow groove 24 disposed on the outermost side in the vehicle width direction. However, no such limitation is intended. The pneumatic tire 10 may include four or more circumferential main grooves and the single circumferential narrow groove 24 disposed on the outermost side in the vehicle width direction (not illustrated). In this case, the plurality of center land portions 33 are formed between the second land portions 32 and 34 on the inner side and the outer side.

Region Inner Side in the Vehicle Width Direction

Figure 3:
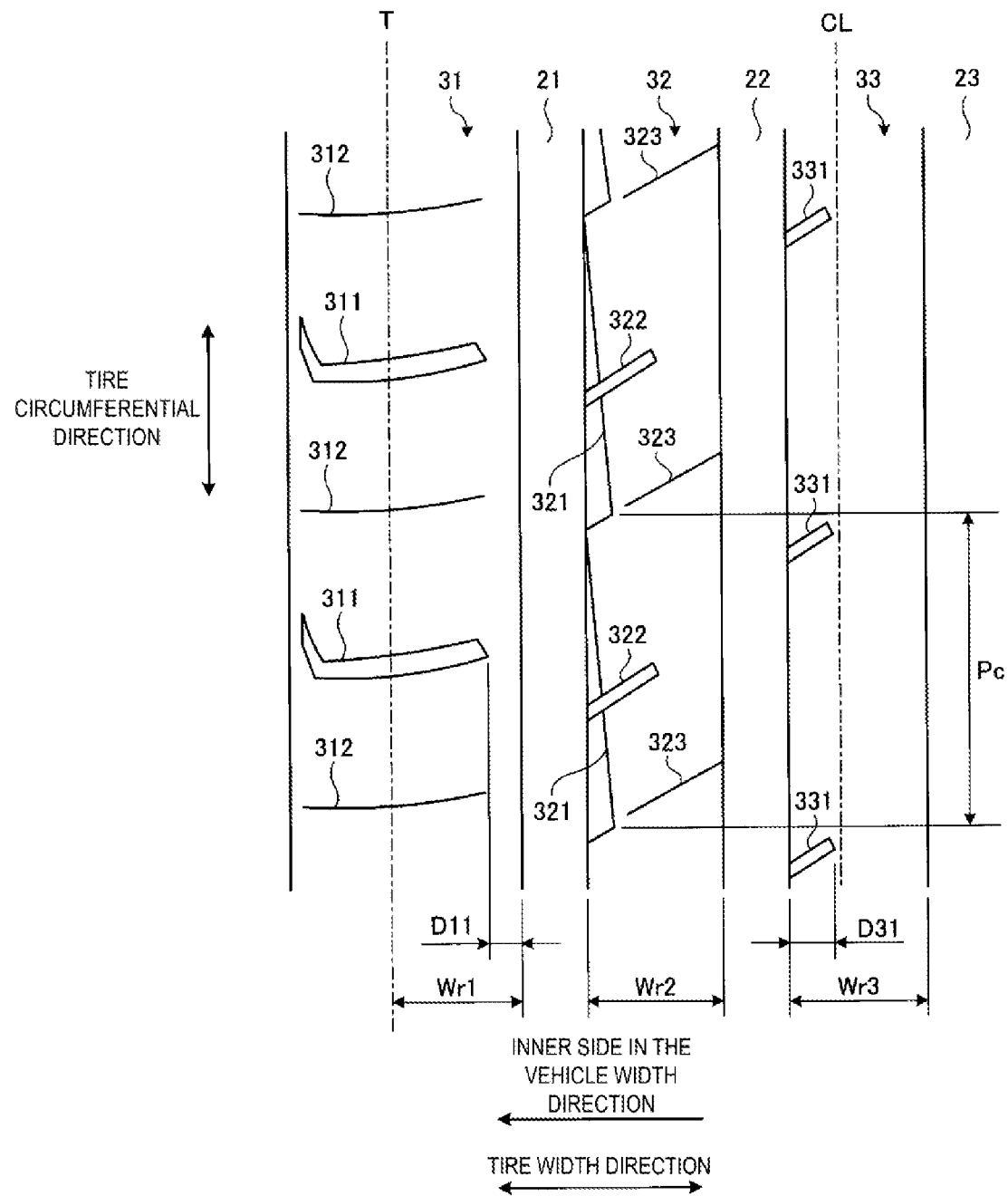
FIG. 3 is an enlarged view illustrating a region inner side in a vehicle width direction of the pneumatic tire illustrated in FIG. 2.

FIG. 3 is an enlarged view illustrating the region inner side in the vehicle width direction of the pneumatic tire illustrated in FIG. 2.

In the configuration of FIG. 2, the region inner side in the vehicle width direction demarcated by the tire equatorial plane CL includes the inner side shoulder main groove 21 and the inner side center main groove 22, and the inner shoulder land portion 31, the inner second land portion 32, and the center land portion 33 defined by these circumferential main grooves 21, 22.

The two circumferential main groove 21, 22 have a straight shape with a constant groove width. A distance Dg1 from the tire equatorial plane CL to the groove center line of the inner side shoulder main groove 21 is in a range from not less than 25% to not greater than 40% to the tire ground contact width TW. A distance Dg2 from the tire equatorial plane CL to the groove center line of the inner side center main groove 22 is in a range from not less than 5% to not greater than 20% to the tire ground contact width TW.

The groove center line of the circumferential main groove is defined as a straight line passing through the midpoint of left and right measured points of the groove width of the circumferential main groove and parallel to the tire circumferential direction.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

Additionally, groove widths of the circumferential main grooves 21, 22 are in a range from not less than 5.0 mm to not greater than 25.0 mm, and the groove depth is in a range from not less than 5.0 mm to not greater than 12.0 mm (dimension symbols are omitted in the drawings).

Inner Shoulder Land Portion

As illustrated in FIG. 3, the inner shoulder land portion 31 includes lug grooves 311 and narrow grooves 312. The lug grooves 311 and the narrow grooves 312 terminate in the inner shoulder land portion 31 without penetrating the inner shoulder land portion 31 at one ends, and extend in the tire width direction to intersect with the tire ground contact edge T. Thus, an edge portion on the inner side shoulder main groove 21 side of the inner shoulder land portion 31 has a plane structure without an opening portion of a groove or a sipe, and extends continuously in the tire circumferential direction. Thus, noise performance of the tire is enhanced. The edge portion with such a plane structure contributes to dry steering stability performance and noise performance of the tire compared to an edge portion having the opening portion of the groove or the sipe.

Additionally, a distance D11 between the lug groove 311 or the narrow groove 312 and the edge portion of the inner shoulder land portion 31 preferably has a relationship $0.10 \leq D11/Wr1 \leq 0.40$ to a ground contact width Wr1 of the inner shoulder land portion 31, and more preferably has a relationship $0.15 \leq D11/Wr1 \leq 0.30$.

The ground contact width of the land portion is measured as the maximum linear distance in the tire axial direction of a contact surface between the tire and a flat plate when the tire is mounted on the specified rim, inflated to the specified internal pressure, placed perpendicular to the flat plate in a static state, and loaded with a load corresponding to the specified load.

Additionally, the ground contact width Wr1 of the inner shoulder land portion 31 preferably has a relationship $0.05 \leq Wr1/TW \leq 0.30$ to the tire ground contact width TW (see FIG. 2).

In the configuration of FIG. 3, the lug grooves 311 and the narrow grooves 312 have a gentle arc shape curved in the tire circumferential direction. However, no such limitation is intended. The lug grooves 311 and the narrow grooves 312 may have a linear shape, and may extend substantially parallel to the tire width direction (not illustrated). Additionally, the plurality of lug grooves 311 and narrow grooves 312 are alternately arranged in the tire circumferential direction at a predetermined pitch. However, no such limitation is intended. The plurality of narrow grooves 312 may be disposed between the adjacent lug grooves 311, 311 (not illustrated).

Inner Second Land Portion

Figure 4:
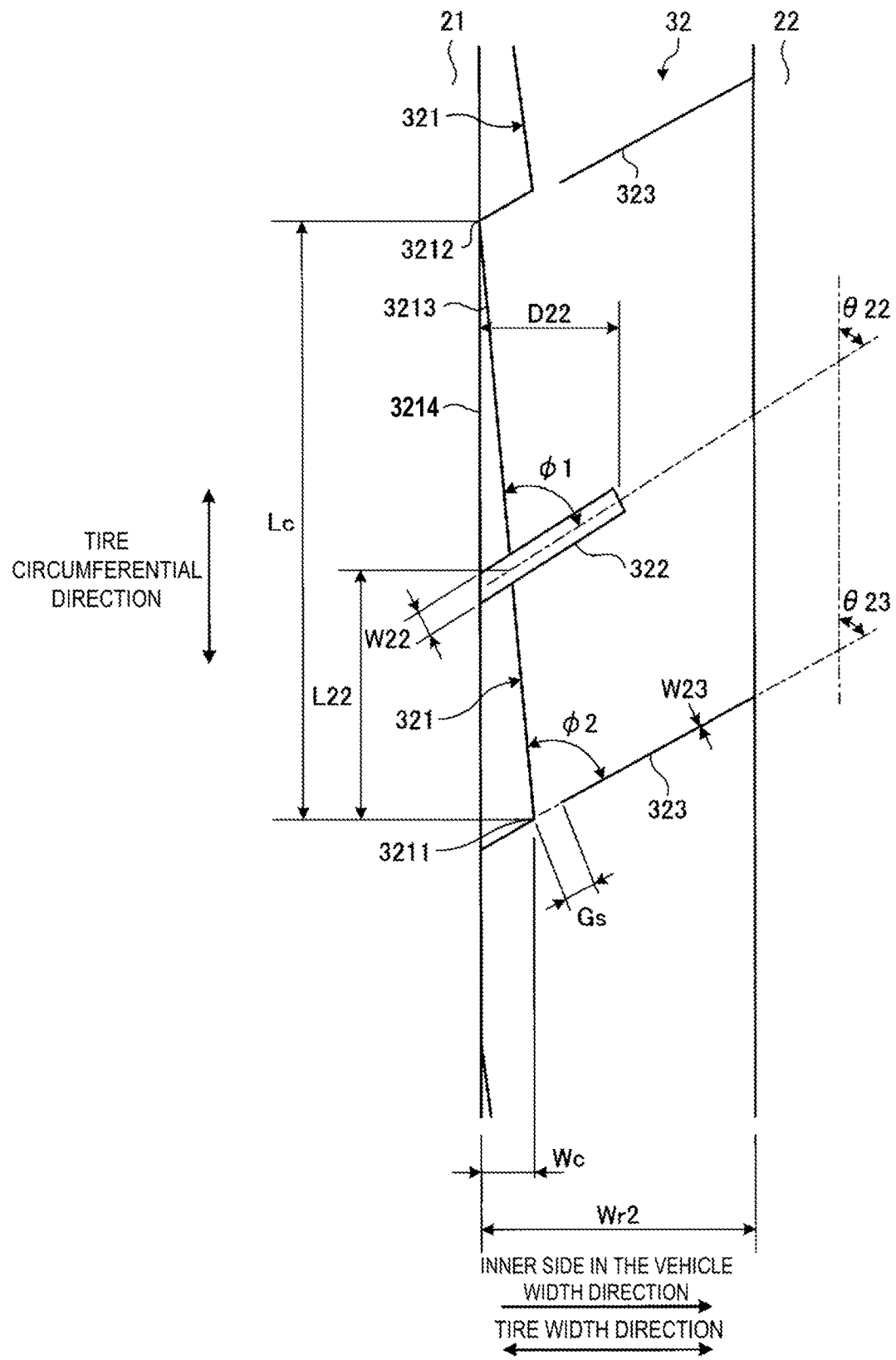
FIG. 4 is an enlarged plan view illustrating an inner second land portion illustrated in FIG. 3.
Figure 5:
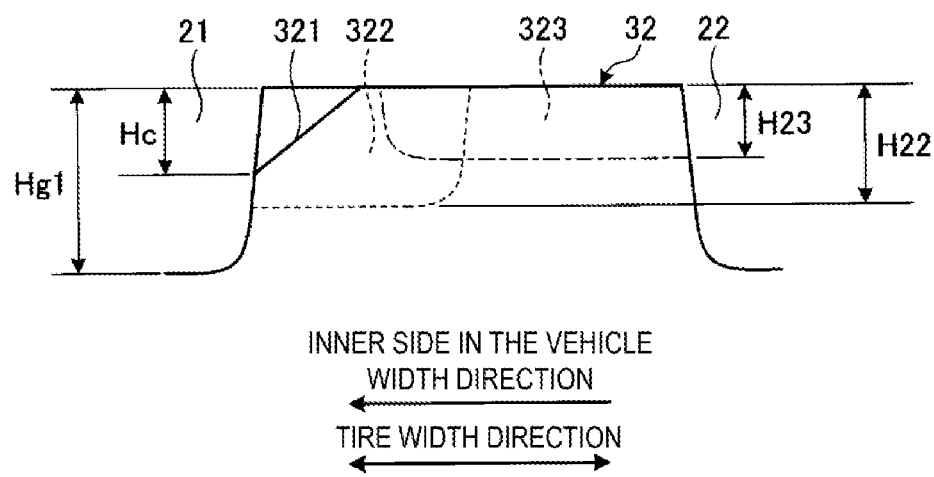
FIG. 5 is a cross-sectional view illustrating the inner second land portion illustrated in FIG. 3.

FIG. 4 and FIG. 5 are an enlarged plan view (FIG. 4) and a cross-sectional view (FIG. 5) illustrating the inner second land portion illustrated in FIG. 3.

As illustrated in FIG. 3, the inner second land portion 32 includes chamfered portions 321 and lug grooves 322 and narrow grooves 323 (first and second lateral grooves) having different groove widths.

The chamfered portions 321 are formed on an edge portion on the tire ground contact edge T side (that is, the inner side shoulder main groove 21 side) of the inner second land portion 32 and connect a road contact surface of the inner second land portion 32 and a groove wall surface of the inner side shoulder main groove 21 by flat surfaces or curved surfaces. Additionally, the chamfered portion 321 has a shape that widens a chamfer width toward the tire circumferential direction on the road contact surface of the inner second land portion 32. Additionally, the plurality of chamfered portions 321 are arranged at a predetermined interval in the tire circumferential direction. By expanding a groove volume of the inner side shoulder main groove 21 with the chamfered portions 321, wet performance of the tire is enhanced.

Additionally, a maximum width Wc of the chamfered portion 321 preferably has a relationship $0.05 \leq Wc/Wr2 \leq 0.30$ to a ground contact width Wr2 of the inner second land portion 32, and more preferably has a relationship $0.15 \leq Wc/Wr2 \leq 0.25$.

The width of the chamfered portion is measured as a distance in the tire width direction from the edge portion of the land portion to a ridge line of the chamfered portion on the road contact surface of the land portion. Additionally, the edge portion of the land portion is defined as a meeting point between an extension line of the groove wall of the circumferential main groove and the road contact surface of the land portion. The ridge line of the chamfered portion is defined as a boundary line between the wall surface of the chamfered portion and the road contact surface of the land portion.

The ground contact width Wr2 of the inner second land portion 32 preferably has a relationship $0.50 \leq Wr2/Wr1 \leq 1.50$ to the ground contact width Wr1 of the inner shoulder land portion 31 and more preferably has a relationship $0.80 \leq Wr2/Wr1 \leq 1.20$. Thus, the ground contact widths Wr1, Wr2 of the left and right land portions 31, 32 defined by the circumferential main grooves 21, 22 are made appropriate.

Additionally, in FIG. 4, a maximum length Lc in the tire circumferential direction from a maximum width position 3211 to a minimum width position 3212 of the chamfered portion 321 preferably has a relationship $0.60 \leq Lc/Pc \leq 1.00$ to a pitch length Pc (see FIG. 3) of the chamfered portions 321, and more preferably has a relationship $0.80 \leq Lc/Pc \leq 1.00$. Thus, a widened region of a chamfer width Wc is properly ensured. Note that the chamfered portions 321, 321 adjacent in the tire circumferential direction may be connected to one another or may be separated from one another provided that the ratio Lc/Pc described above is satisfied.

In FIG. 5, a maximum depth Hc of the chamfered portion 321 preferably has a relationship $0.20 \leq Hc/Hg1 \leq 0.70$ to a maximum depth Hg1 of the circumferential main groove 21, and more preferably has a relationship $0.30 \leq Hc/Hg1 \leq 0.50$.

For example, in the configuration of FIG. 4 and FIG. 5, the chamfered portion 321 has a triangular pyramid shape with the minimum width position 3212 as its apex. Also, as illustrated in FIG. 4, the chamfered portion 321 has a triangular shape formed by connecting long portions (parts formed of reference signs 3213 and 3214) and a short portion (reference sign is omitted in the drawings) on the road contact surface of the inner second land portion 32, and the chamfer width of the long portion of the chamfered portion 321 gradually increases in one direction in the tire circumferential direction. Additionally, as illustrated in FIG. 5, the chamfered portion 321 is corner-chamfered to connect the road contact surface of the inner second land portion 32 and the groove wall surface of the inner side shoulder main groove 21 by the flat surface. However, no such limitation is intended. The chamfered portion 321 may be rounded-chamfered to connect the road contact surface of the inner second land portion 32 and the groove wall surface of the inner side shoulder main groove 21 by a curved surface. In addition, the adjacent chamfered portions 321, 321 are continuously arranged without gaps. Thus, the ridge lines of the chamfered portions 321 have a zigzag shape extending in the tire circumferential direction along the edge portion of the inner second land portion 32.

The lug grooves 322 are first lateral grooves disposed corresponding to the chamfered portions 321. As illustrated in FIG. 3, the lug groove 322 terminates in the inner second land portion 32 at one end portion and opens to the central portion in the longitudinal direction of the chamfered portion 321 at the other end portion and communicates with the inner side shoulder main groove 21.

With such a configuration in which the lug grooves 322 communicate with the inner side shoulder main groove 21, drainage properties of the inner second land portion 32 are improved and the wet steering stability performance of the tire is improved. Additionally, because the lug grooves 322 do not penetrate the inner second land portion 32, rigidity of the inner second land portion 32 is ensured, and the dry steering stability performance of the tire is ensured. Additionally, the lug groove 322 opens to the central portion in the longitudinal direction of the chamfered portion 321, so the drainage properties of the inner second land portion 32 are improved, and the wet steering stability performance of the tire is improved.

Additionally, in FIG. 4, an extension length D22 in the tire width direction of the lug groove 322 preferably has a relationship $0.20 \leq D22/Wr2 \leq 0.80$ to the ground contact width Wr2 of the inner second land portion 32, and more preferably has a relationship $0.40 \leq D22/Wr2 \leq 0.60$. Accordingly, the lug grooves 322 preferably terminate at the substantially central portion of the inner second land portion 32.

The extension length of the lug groove is measured as a distance in the tire width direction from the edge portion on the circumferential main groove side of the land portion to a terminating end portion of the lug groove.

Additionally, a maximum groove width W22 of the lug groove 322 preferably has a relationship $0.03 \leq W22/Lc \leq 0.10$ to the maximum length Lc in the tire circumferential direction from the maximum width position 3211 to the minimum width position 3212 of the chamfered portion 321, and more preferably has a relationship $0.04 \leq W22/Lc \leq 0.07$. Additionally, the maximum groove width W22 of the lug groove 322 is preferably in a range 2.5 mm $\leq W22 \leq 6.5$ mm.

The maximum groove width of the lug groove is measured as the maximum width of the lug groove on the road contact surface of the land portion. When the lug groove is a chamfered sipe as described later, the maximum groove width is measured as the maximum width including the chamfered portion.

In addition, an inclination angle θ22 of the lug groove 322 with respect to the tire circumferential direction is preferably in a range 30 degrees $\leq \theta 22 \leq 85$ degrees, and more preferably in a range 50 degrees $\leq \theta 22 \leq 70$ degrees.

The inclination angle of the lug groove is measured as an angle formed by an imaginary line connecting both end portions of the lug groove and the tire circumferential direction.

Also, a distance L22 in the tire circumferential direction from the maximum width position 3211 of the chamfered portion 321 to the opening position of the lug groove 322 to the chamfered portion 321 preferably has a relationship $0.35 \leq L22/Lc \leq 0.65$ to the maximum length Lc in the tire circumferential direction from the maximum width position 3211 to the minimum width position 3212 of the chamfered portion 321, and more preferably has a relationship $0.40 \leq L22/Lc \leq 0.60$. Accordingly, the lug groove 322 opens to the central portion in the longitudinal direction of the chamfered portion 321.

Additionally, in FIG. 5, a maximum groove depth H22 of the lug groove 322 preferably has a relationship $0.40 \leq H22/Hg1 \leq 0.85$ to the maximum depth Hg1 of the circumferential main groove 21, and more preferably has a relationship $0.50 \leq H22/Hg1 \leq 0.75$. Also, as illustrated in FIG. 5, the maximum groove depth H22 of the lug groove 322 is set to be greater than the maximum depth Hc of the chamfered portion 321.

For example, in the configuration of FIG. 4 and FIG. 5, the lug groove 322 has a short linear shape or a gentle arc shape, and opens to the central portion of the long portion 3213 of the chamfered portion 321. Additionally, the number of disposed lug grooves 322 is the same as the number of disposed chamfered portions 321, and the single lug groove 322 opens to one chamfered portion 321. Accordingly, the long portion 3213 of the chamfered portion 321 is divided in the tire circumferential direction by the lug groove 322. In addition, an inclination angle φ1 of the lug groove 322 with respect to a ridge line of the long portion 3213 of the chamfered portion 321 is in a range 35 degrees $\leq \varphi 1 \leq 80$ degrees.

The narrow groove 323 is the second lateral groove disposed corresponding to the chamfered portion 321, opens to the edge portion on the tire equatorial plane CL side of the inner second land portion 32 at one end portion, and terminates near the maximum width position 3211 of the chamfered portion 321 at the other end (see FIG. 4). However, no such limitation is intended. The narrow groove 323 may be connected to the maximum width position 3211 of the chamfered portion 321 (not illustrated). Additionally, as long as the terminating end of the narrow groove 323 is at a distance within a range of 2.5 mm from the maximum width position 3211 of the chamfered portion 321, it can be said that the narrow groove 323 terminates near the maximum width position 3211 of the chamfered portion 321, or is connected to the maximum width position 3211 of the chamfered portion 321.

In the configuration described above, the lateral groove that opens to the central portion of the chamfered portion 321 is the wider lug groove 322, and the lateral groove that terminates at or opens to the maximum width position 3211 of the chamfered portion 321 is the narrower narrow groove 323, and therefore, the following advantages are provided. That is, (a) compared to a configuration in which all grooves disposed in the inner second land portion 32 are wider lateral grooves (not illustrated), the rigidity of the inner second land portion 32 is ensured, and the dry performance of the tire is ensured.

Additionally, (b) compared to a configuration in which all grooves disposed in the inner second land portion 32 are narrower narrow grooves or sipes (not illustrated), the drainage properties of the inner second land portion 32 are improved, and the wet steering stability performance of the tire is improved. Additionally, (c) compared to a configuration in which the wider lug grooves open to the maximum width positions of the chamfered portions and the narrower narrow grooves or sipes terminate at or open to the central portions of the chamfered portions (not illustrated), the rigidity of the inner second land portion 32 at the maximum width positions 3211 of the chamfered portions 321 can be ensured while the drainage function from the lug grooves 322 to the chamfered portions 321 is ensured. Thus, the dry steering stability performance and the wet steering stability performance of the tire are provided in a compatible manner.

Additionally, in FIG. 4, a maximum groove width W23 of the narrow groove 323 preferably has a relationship $0 < W23/W22 \leq 0.80$ to the maximum groove width W22 of the lug groove 322, and more preferably has a relationship $0 < W23/W22 \leq 0.50$. Accordingly, the groove width of the narrow groove 323 is set to be sufficiently narrow relative to the groove width of the lug groove 322.

In addition, the maximum groove width W23 of the narrow groove 323 is preferably in a range 0.4 mm $\leq W23 \leq 1.5$ mm, and more preferably in a range 0.5 mm $\leq W23 \leq 1.0$ mm. Furthermore, the narrow groove 323 is preferably a sipe that closes when the tire comes into contact with the ground.

Additionally, an inclination angle θ23 of the narrow groove 323 with respect to the tire circumferential direction is preferably in a range 30 degrees $\leq \theta 23 \leq 85$ degrees, and more preferably in a range 50 degrees $\leq \theta 23 \leq 70$ degrees.

Additionally, a maximum groove depth H23 of the narrow groove 323 preferably has a relationship $0.20 \leq H23/Hg1 \leq 0.70$ to the maximum depth Hg1 of the circumferential main groove 21, and more preferably has a relationship $0.40 \leq H23/Hg1 \leq 0.60$. Also, the maximum groove depth H23 of the narrow groove 323 is set to be smaller than the maximum groove depth H22 of the lug groove 322.

For example, in the configuration of FIG. 4 and FIG. 5, the narrow groove 323 has the short linear shape or the gentle arc shape. Additionally, the number of disposed narrow grooves 323 is the same as the number of disposed chamfered portions 321, and the single narrow groove 323 is disposed opposed to one chamfered portion 321. In addition, an inclination angle φ2 of the narrow groove 323 with respect to a ridge line of the long portion 3213 of the chamfered portion 321 is in a range 35 degrees≤φ2≤80 degrees.

Furthermore, as illustrated in FIG. 4, it terminates near the maximum width position 3211 of the chamfered portion 321. In addition, a distance Gs between the terminating end of the narrow groove 323 and the maximum width position 3211 of the chamfered portion 321 is in a range Gs≤1.5 mm. Such a configuration allows forming a fine clearance between a molding blade of the narrow groove 323 and a molding blade of the chamfered portion 321 in a tire mold (not illustrated) during tire vulcanization molding, which is preferred in terms of ensuring reducing vulcanization defects due to dead air space. While the lower limit of the distance Gs is not particularly limited, the lower limit of 0.3 mm or more ensures a flow path for air and ensures the effect of reducing vulcanization defects described above.

Additionally, as illustrated in FIG. 4, only the narrower narrow grooves 323 are open to the edge portion on the tire equatorial plane CL side of the inner second land portion 32, and other wider lateral grooves do not open. Accordingly, the rigidity of the edge portion on the tire equatorial plane CL side of the inner second land portion 32 is ensured, and the dry performance of the tire is enhanced.

MODIFIED EXAMPLES

Figure 6:
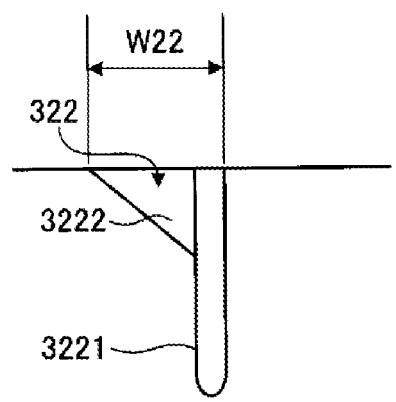
FIG. 6 is an explanatory diagram illustrating a modified example of a lug groove of the second land portion illustrated in FIG. 4.

FIG. 6 is an explanatory diagram illustrating the modified example of the lug groove of the second land portion illustrated in FIG. 4. The same drawing illustrates a cross-sectional view in a groove depth direction of the lug groove 322.

In the configuration of FIG. 4, the lug groove 322 has a U-shaped cross-sectional shape (not illustrated), and has a groove width substantially constant from the beginning to the middle period of wear. However, no such limitation is intended. The lug groove 322 may be a chamfered sipe as illustrated in FIG. 6. In other words, the lug groove 322 may include a narrower sipe portion 3221 that closes when the tire comes into contact with the ground and a chamfered portion 3222 formed in an opening portion of the sipe portion 3221 and widens the groove width W22.

Center Land Portion

In FIG. 3, the center land portion 33 includes a plurality of lug grooves 331.

The lug grooves 331 terminate in the center land portion 33 at one end portions and open to an edge portion inner side in the vehicle width direction of the center land portion 33 at the other end portions.

Additionally, an extension length D31 in the tire width direction of the lug groove 331 preferably has a relationship 0.10≤D31/Wr3≤0.60 to a ground contact width Wr3 of the center land portion 33, and more preferably has a relationship 0.20≤D31/Wr3≤0.40. Accordingly, the lug grooves 331 preferably terminate at the substantially central portion of the center land portion 33.

Additionally, a maximum groove width W31 (dimension symbol is omitted in the drawings) of the lug groove 331 in the center land portion 33 preferably has a relationship 0.90≤W31/W22≤1.50 to the maximum groove width W22 of the lug groove 322 in the inner second land portion 32, and more preferably has a relationship 0.95≤W31/W22≤1.05. Additionally, the maximum groove width W31 of the lug groove 331 is preferably in a range 2.5 mm≤W31≤6.5 mm.

Region Outer Side in the Vehicle Width Direction

In the configuration of FIG. 2, the region outer side in the vehicle width direction demarcated by the tire equatorial plane CL includes the single circumferential main groove 23 and the single circumferential narrow groove 24 disposed outward of the circumferential main groove 23 in the tire width direction. Additionally, the outer shoulder land portion 35 and the outer second land portion 34 are defined by the circumferential grooves 23, 24.

In the configuration of FIG. 2, the outer side center circumferential main groove 23 and the circumferential narrow groove 24 have a straight shape with a constant groove width. A distance Dg3 from the tire equatorial plane CL to the groove center line of the outer side center circumferential main groove 23 is in a range from not less than 5% to not greater than 20% to the tire ground contact width TW. A distance Dg4 from the tire equatorial plane CL to the groove center line of the circumferential narrow groove 24 is in a range from not less than 25% to not greater than 40% to the tire ground contact width TW.

Additionally, a groove width Ws (see FIG. 8 described later) of the circumferential narrow groove 24 is in a range from not less than 3.0 mm to not greater than 7.0 mm, and the groove depth is in a range from not less than 3.0 mm to not greater than 7.0 mm (dimension symbols are omitted in the drawings).

Closed Lug Grooves in the Region Outer Side in the Vehicle Width Direction

Figure 7:
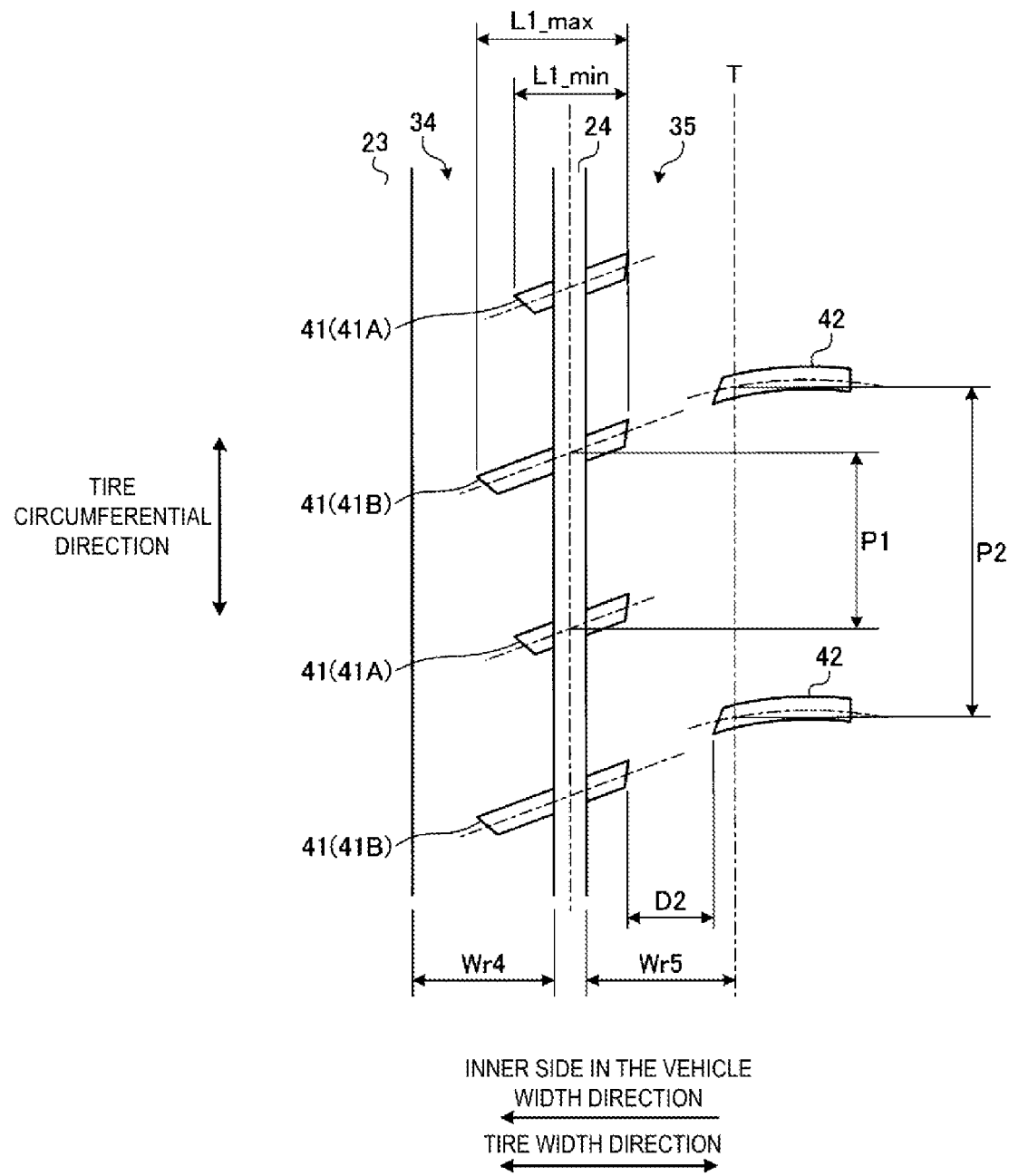
FIG. 7 is an enlarged view illustrating a main portion of a region outer side in the vehicle width direction of the pneumatic tire illustrated in FIG. 2.
Figure 8:
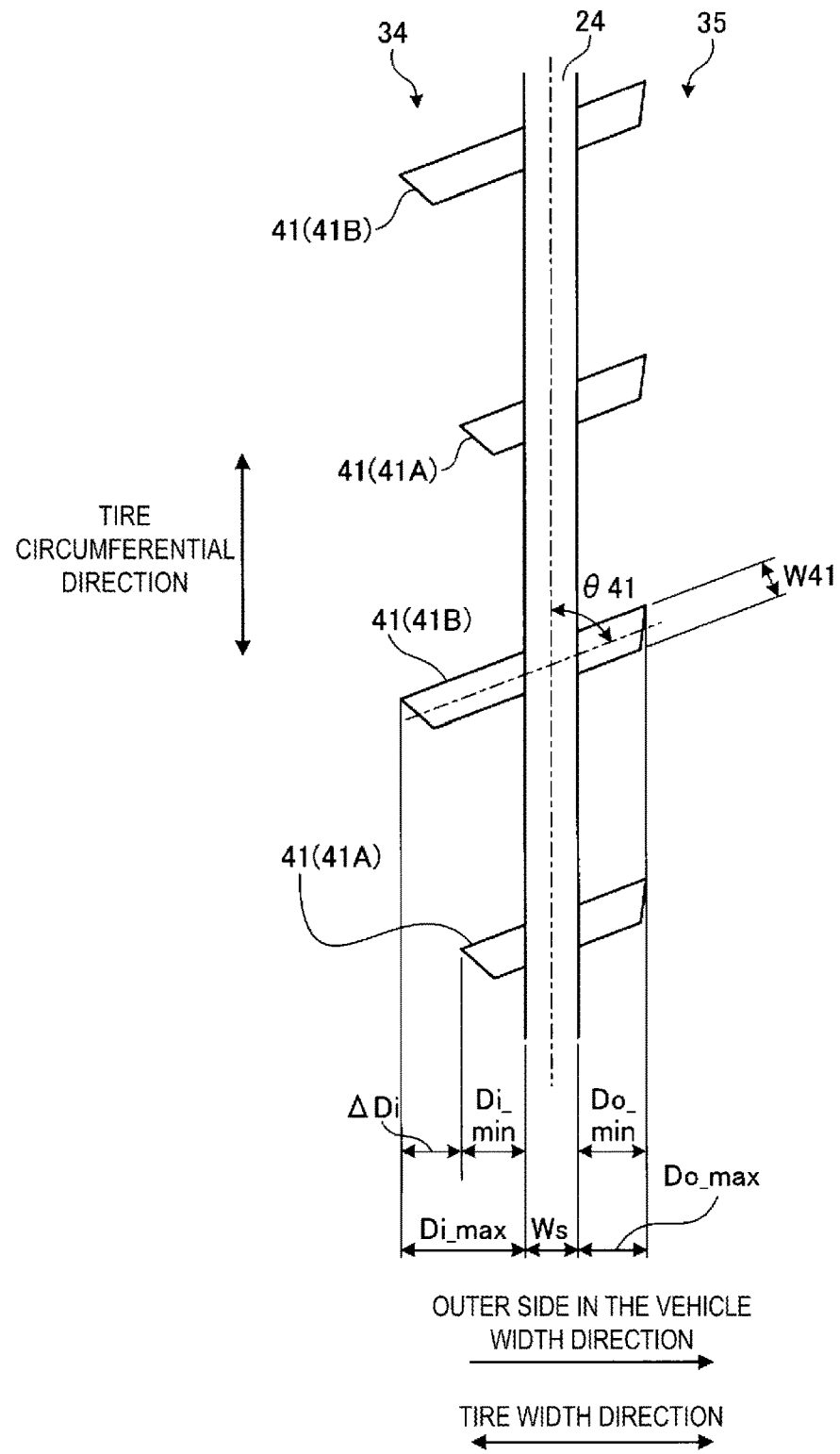
FIG. 8 is an explanatory diagram illustrating closed lug grooves of the pneumatic tire illustrated in FIG. 7.

FIG. 7 is an enlarged view illustrating a main portion of the region outer side in the vehicle width direction of the pneumatic tire illustrated in FIG. 2. FIG. 8 is an explanatory diagram illustrating the closed lug grooves of the pneumatic tire illustrated in FIG. 7. In these drawings, FIG. 7 illustrates the outer second land portion 34 and the outer shoulder land portion 35 in the region outer side in the vehicle width direction, and FIG. 8 illustrates an enlarged view in which the circumferential narrow groove 24 and a plurality of closed lug grooves 41 are extracted.

As illustrated in FIG. 2, the pneumatic tire 10 includes the circumferential narrow groove 24 described above and the plurality of closed lug grooves 41 (41A, 41B) in the region outer side in the vehicle width direction.

The closed lug grooves 41 extend in the tire width direction, penetrate the circumferential narrow groove 24, and terminate inside the outer second land portion 34 and the outer shoulder land portion 35 without opening to the circumferential main groove 23 or the tire ground contact edge T. Therefore, the closed lug grooves 41 branch in the tire width direction from the circumferential narrow groove 24 like branches and terminate inside the left and right land portions 34, 35. Here, a terminating end portion inner side in the tire width direction of the closed lug groove 41 is simply referred to as an "inner terminating end portion" and a terminating end portion outer side in the tire width direction is simply referred to as an "outer terminating end portion." Additionally, the plurality of the closed lug grooves 41 (41A, 41B) are arranged at a predetermined interval in the tire circumferential direction.

Additionally, as illustrated in FIG. 7, the plurality of types of closed lug grooves 41 (41A, 41B) having mutually different extension lengths are disposed in a mixed manner.

In the configuration described above, the closed lug grooves 41 penetrating the circumferential narrow groove 24 improve drainage properties in the vicinity of the circumferential narrow groove 24 to improve wet performance of the tire. At the same time, since the closed lug grooves 41 do not open to the circumferential main groove 23 or the tire ground contact edge T, rigidity of the left and right land portions 34, 35 defined by the circumferential narrow groove 24 is ensured. Thus, the wet performance and dry performance of the tire are efficiently provided in a compatible manner.

Additionally, since the plurality of types of the closed lug grooves 41 (41A, 41B) having the mutually different extension lengths are arranged at the predetermined interval in the tire circumferential direction, naturally, the terminating end portions of the closed lug grooves 41A, 41B in at least one land portion (the outer second land portion 34 in FIG. 7) are arranged in the tire circumferential direction while mutually offsetting in the tire width direction. Therefore, compared to a configuration in which the left and right terminating end portions of the closed lug grooves are arranged with the positions in the tire width direction aligned (not illustrated), the long lug groove portions (the parts on the outer second land portion 34 side of the second closed lug grooves 41B in FIG. 7) are disposed on the road contact surface of one land portion (the outer second land portion 34 in FIG. 7), and the wider ground contact regions are formed between the adjacent long lug grooves at the same time. Thus, the wet performance and the dry performance of the tire are efficiently improved.

In addition, among the plurality of types of closed lug grooves 41, an extension length L1_min of the shortest closed lug groove 41A and an extension length L1_max of the longest closed lug groove 41B preferably have a relationship $1.10 \leq L1\_max/L1\_min \leq 3.00$ and more preferably have a relationship $1.20 \leq L1\_max/L1\_min \leq 1.60$. The ranges of the extension lengths L1 of the closed lug grooves 41 are not particularly limited, but are subject to restrictions by ranges of distances Di, Do (see FIG. 8) of the terminating end portions of the closed lug grooves 41 in the respective land portions 34, 35 described later.

The extension lengths L1 of the lug grooves are defined as distances in the tire width direction from the inner terminating end portions to the outer terminating end portions of the lug grooves when the tire is mounted on the specified rim, inflated to the specified internal pressure, and in an unloaded state. In a configuration in which three or more types of closed lug grooves having mutually different extension lengths are provided, the extension lengths L1_min of the shortest first closed lug grooves and the extension lengths L1_max of the longest second closed lug grooves are each measured.

For example, in the configuration of FIG. 7, the plurality of closed lug grooves 41 (41A, 41B) are arranged at the predetermined interval in the tire circumferential direction. Moreover, the closed lug grooves 41A, 41B intersect with only the circumferential narrow groove 24 and are not connected to the other grooves or sipes. Additionally, the outer second land portion 34 and the outer shoulder land portion 35 are not divided in the tire circumferential direction by the lug grooves or sipes, and have road contact surfaces continuous in the tire circumferential direction. Additionally, the first and second closed lug grooves 41A, 41B are arranged parallel to one another by inclination of their longitudinal directions in a same direction and at a same inclination angle with respect to the tire circumferential direction. However, inclination angles θ of the plurality of closed lug grooves 41A, 41B may be different within a range described later.

Additionally, in FIG. 7, ground contact widths Wr4, Wr5 of the outer second land portion 34 and the outer shoulder land portion 35 preferably have a relationship $1.00 \leq Wr5/Wr4 \leq 2.00$, and more preferably have a relationship $1.10 \leq Wr5/Wr4 \leq 1.50$. Additionally, the ground contact width Wr4 of the outer second land portion 34 preferably has a relationship $0 \leq Wr4/TW \leq 0.30$ to the tire ground contact width TW. Thus, the ground contact widths Wr4, Wr5 of the left and right land portions 34, 35 defined by the circumferential main groove 23 and the circumferential narrow groove 24 are made appropriate.

Additionally, the plurality of the closed lug grooves 41 (41A, 41B) are arranged such that at least one of the terminating end portions are mutually offset in the tire width direction. At this time, the terminating end portions of the closed lug grooves 41 may be offset on the outer second land portion 34 side (see FIG. 7) or may be offset on the outer shoulder land portion 35 side, or may be offset on both the outer second land portion 34 side and the outer shoulder land portion 35 side (not illustrated). Additionally, the plurality of types of closed lug grooves 41A, 41B having the mutually different lengths are arranged in a predetermined order in the tire circumferential direction. At this time, the two types of the closed lug grooves 41A, 41B may be arranged in alternation in the tire circumferential direction (see FIG. 7), or three or more types of the closed lug grooves 41 may be arranged (not illustrated).

Additionally, in FIG. 8, the distance Di from the circumferential narrow groove 24 to the inner terminating end portions of the closed lug grooves 41 (41A, 41B) (including a minimum value Di_min and a maximum value Di_max in FIG. 8) and the ground contact width Wr4 (see FIG. 7) of the second land portion 34 preferably have a relationship $0.10 \leq Di/Wr4 \leq 0.80$, and more preferably have a relationship $0.20 \leq Di/Wr4 \leq 0.70$. Accordingly, the extension lengths Di in the tire width direction of the closed lug grooves 41 in the outer second land portion 34 are made appropriate.

Also, in FIG. 8, the distance Do (including a minimum value Do_min and a maximum value Do_max in FIG. 8) from the circumferential narrow groove 24 to the outer terminating end portions of the closed lug grooves 41 (41A, 41B) and the ground contact width Wr5 (see FIG. 7) of the outer shoulder land portion 35 preferably have a relationship $0.10 \leq Do/Wr5 \leq 0.60$, and more preferably have a relationship $0.20 \leq Do/Wr5 \leq 0.40$. As a result, the extension lengths in the tire width direction of the closed lug grooves 41 in the outer shoulder land portion 35 are made appropriate.

The distances Di, Do to the terminating end portions of the lug grooves are measured as distances in the tire width direction from measured points of the ground contact widths Wr4, Wr5 of the land portions to the terminating end portions of the lug grooves when the tire is mounted on a specified rim, inflated to the specified internal pressure, and in an unloaded state. In addition, in configuration in which three or more types of the distances Di and Do having mutually different values are present, the maximum values Di_max, Do_max and the minimum values of Di_min, Do_min of the distances Di and Do each need to meet the conditions described above.

In FIG. 8, the minimum value Di_min and the maximum value Di_max of the distance Di of the inner terminating end portions of the plurality of closed lug grooves 41 (41A, 41B) preferably have a relationship $1.10 \leq Di\_max/Di\_min \leq 3.00$, and more preferably have a relationship $1.50 \leq Di\_max/Di\_min \leq 2.50$. Additionally, an offset amount ΔDi in the tire width direction of the inner terminating end portions of the closed lug grooves 41 preferably has a relationship $0.10 \leq \Delta Di/Wr4 \leq 0.60$ to the ground contact width Wr4 (see FIG. 7) of the outer second land portion 34, and more preferably has a relationship $0.20 \leq \Delta Di/Wr4 \leq 0.40$. Accordingly, in the outer second land portion 34, the terminating end portions of the closed lug grooves 41A, 41B are arranged offset in the tire width direction. As a result, the positions of the inner terminating end portions of the closed lug grooves 41A, 41B in the outer second land portion 34 are made appropriate, and the wet performance and the dry performance of the tire are provided in a compatible manner. In particular, since the contribution to wet performance is great in the outer second land portion 34, the wet performance of the tire is efficiently improved by the configuration described above.

On the other hand, the minimum value Do_min and the maximum value Do_max of the distance Do of the outer terminating end portions of the plurality of closed lug grooves 41 (41A, 41B) preferably have a relationship $0.90 \leq Do\_max/Do\_min \leq 1.10$ and more preferably have a relationship $0.95 \leq Do\_max/Do\_min \leq 1.05$. Additionally, an offset amount $\Delta Do$ in the tire width direction of the outer terminating end portions of the closed lug grooves 41 preferably has a relationship $0 \leq \Delta Do/Wr5 \leq 0.10$ to the ground contact width Wr5 (see FIG. 7) of the outer shoulder land portion 35, and more preferably has a relationship $0 \leq \Delta Do/Wr5 \leq 0.05$. Accordingly, in the outer shoulder land portion 35, the terminating end portions of the closed lug grooves 41A, 41B are arranged with the positions in the tire width direction aligned. Thus, the rigidity of the outer shoulder land portion 35 can be properly ensured, so dry braking performance of the tire is improved.

The offset amounts $\Delta Di$ and $\Delta Do$ of the terminating end portions of the lug grooves are calculated as differences between the maximum values Di_max, Do_max and the minimum values Di_min, Do_min of the distances Di, Do from the circumferential narrow groove to the terminating end portions. Also, as illustrated in FIG. 8, the plurality of closed lug grooves 41 (41A, 41B) are disposed so that their longitudinal directions are inclined in the same direction with respect to the tire circumferential direction. Additionally, the closed lug groove 41 has an inclination angle $\theta 41$ with respect to the tire circumferential direction preferably in a range 50 degrees $\leq \theta 41 \leq 80$ degrees, and more preferably in a range 60 degrees $\leq \theta 41 \leq 75$ degrees. As a result, the drainage properties of the closed lug grooves 41 are improved, and pattern noise of the tire caused by the closed lug grooves 41 is reduced.

Additionally, an inclination angle $\theta 41\_min$ of the closed lug groove 41 inclined the smallest and an inclination angle $\theta 41\_max$ of the closed lug groove 41 inclined the largest preferably have a relationship 0 degrees $\leq \theta 41\_max - \theta 41\_min \leq 15$ degrees, and more preferably have a relationship 0 degrees $\leq \theta 41\_max - \theta 41\_min \leq 10$ degrees. In other words, the inclination angles $\theta 41$ of the closed lug grooves 41 are preferably approximately constant. As a result, the rigidity of the land portion can be properly ensured, so uneven wear is suppressed.

Additionally, a groove width W41 of the closed lug groove 41 and the groove width Ws of the circumferential narrow groove 24 preferably have a relationship $0.30 \leq W41/Ws \leq 1.50$ and more preferably have a relationship $0.60 \leq W41/Ws \leq 1.30$. As a result, a drainage action of the closed lug grooves 41 is properly ensured.

Additionally, a groove width W41_min of the narrowest closed lug groove 41 and a groove width W41_max (not illustrated) of the widest closed lug groove 41 preferably have a relationship $1.00 \leq W41\_max/W41\_min \leq 2.00$ and more preferably have a relationship $1.00 \leq W41\_max/W41\_min \leq 1.50$. In other words, the groove widths W41_min of the closed lug grooves 41 are preferably uniform. As a result, the rigidity of the land portion can be properly ensured, so uneven wear is suppressed.

For example, in the configuration of FIG. 8, the closed lug grooves 41 have a straight shape with constant groove widths as a whole and have a tapered shape with narrowed groove widths at their terminating end portions. Additionally, by narrowing the groove widths of the left and right terminating end portions of the closed lug groove 41 in the same direction in the tire circumferential direction, the entire closed lug groove 41 has a trapezoidal shape having an upper bottom and a lower bottom in the tire circumferential direction. Additionally, the plurality of closed lug grooves 41A, 41B are arranged in the same direction in the tire circumferential direction. However, the configuration is not limited to this, and the terminating end portions of the closed lug groove 41 may have a rectangular shape or an arc shape (not illustrated). Furthermore, the entire closed lug groove 41 may have a rectangular shape or a parallelogram shape (not illustrated).

Additionally, in the configuration of FIG. 7, edge portions on the circumferential main groove 23 side of the center land portion 33 and the outer second land portion 34 have a plain structure that does not have an opening portion of a sipe or a groove, and thus extend continuously in the tire circumferential direction. Thus, noise performance of the tire is enhanced. Shoulder Lug Grooves in the Region Outer Side in the Vehicle Width Direction In the configuration of FIG. 2, the outer shoulder land portion 35 in the region outer side in the vehicle width direction includes a plurality of shoulder lug grooves 42 in the region outer side in the vehicle width direction.

The shoulder lug groove 42 has one terminating end portion inside the outer shoulder land portion 35, extends in the tire width direction, and opens to the tire ground contact edge T. Additionally, the shoulder lug groove 42 does not communicate with the circumferential narrow grooves 24 or the closed lug groove 41 and does not overlap in the tire width direction. Additionally, the plurality of shoulder lug grooves 42 are arranged at a predetermined interval in the tire circumferential direction.

Also, as illustrated in FIG. 7, the shoulder lug groove 42 is on an extension line of the groove center line of the long closed lug groove 41B. In the configuration of FIG. 7, the groove center line of the long closed lug groove 41B has a straight shape, and the groove center line of the shoulder lug groove 42 has a gentle arc shape. Also, an opening portion of the shoulder lug groove 42 in the tire ground contact surface is on the extension line of the groove center line of the closed lug groove 41B. Thus, the drainage properties from the outer second land portion 34 to the outer shoulder land portion 35 are improved. Note that the configuration is not limited to the one described above, and the short closed lug groove 41A may be on the extension line of the groove center line of the shoulder lug groove 42 (not illustrated).

Also, as illustrated in FIG. 7, the terminating end portion of the shoulder lug groove 42 and the outer terminating end portion of the closed lug groove 41B opposed to the shoulder lug groove 42 are mutually separated in the tire width direction. Additionally, the shoulder lug groove 42 and the closed lug groove 41B are not connected with another groove or sipe. Additionally, a distance D2, which is from the terminating end portion of the shoulder lug grooves 42 to the outer terminating end portion of the closed lug groove 41B in the tire width direction, and the ground contact width Wr5 of the outer shoulder land portion 35 preferably have a relationship $0.10 \leq D2/Wr5 \leq 0.70$ and more preferably have a relationship $0.30 \leq D2/Wr5 \leq 0.60$. As a result, the wet performance and the dry performance of the tire are provided in a compatible manner. That is, the lower limit ensures the rigidity and the ground contact region of the shoulder land portion 35 and ensures the dry performance of the tire. Also, the upper limit ensures the extension lengths of the closed lug grooves 41 and the shoulder lug grooves 42 in the tire width direction and ensures the wet performance of the tire.

Furthermore, in the configuration of FIG. 7, the outer shoulder land portion 35 has a plain road contact surface continuous in the tire circumferential direction without divided by a groove or a sipe in a region between all of the terminating end portions of the shoulder lug grooves 42 and all of the outer terminating end portions of the closed lug grooves 41 (41A, 41B). In other words, the shoulder lug grooves 42 and the closed lug grooves 41 do not mutually overlap in the tire width direction. This further improves the dry performance of the tire.

Additionally, in FIG. 7, an arrangement interval P1 of the closed lug grooves 41 (41A, 41B) adjacent in the tire circumferential direction preferably has a relationship $0.30 \leq P1/P2 \leq 0.70$ to an arrangement interval P2 of the shoulder lug grooves 42, and more preferably has a relationship $0.40 \leq P1/P2 \leq 0.60$. As a result, the arrangement intervals P1, P2 of the closed lug grooves 41 and the shoulder lug grooves 42 are made appropriate. In the configuration of FIG. 7, a pair of the closed lug grooves 41A, 41B as one set of the short closed lug groove 41A and the long closed lug groove 41B and one shoulder lug groove 42 are arranged in the tire circumferential direction at mutually same pitch length.

The arrangement intervals P1, P2 of the lug grooves are measured using meeting points of the groove center lines of the lug grooves and the groove center line of the circumferential narrow groove or the tire ground contact edge as measured points.

EFFECTS

As described above, the pneumatic tire 10 has the designation of the mounting direction to a vehicle. The pneumatic tire 10 includes the inner side shoulder main groove 21 and the inner side center main groove 22, the outer side center circumferential main groove 23, the circumferential narrow groove 24, the inner shoulder land portion 31 and the inner second land portion 32, and the outer second land portion 34 and the outer shoulder land portion 35. The inner side shoulder main groove 21 and the inner side center main groove 22 are disposed in the region inner side in the vehicle width direction demarcated by the tire equatorial plane CL. The outer side center circumferential main groove 23 is disposed in the region outer side in the vehicle width direction. The circumferential narrow groove 24 is disposed outward of the outer side center circumferential main groove 23 in the vehicle width direction. The inner shoulder land portion 31 and the inner second land portion 32 are defined by the inner side shoulder main groove 21 and the inner side center main groove 22. The outer second land portion 34 and the outer shoulder land portion 35 are defined by the outer side center circumferential main groove 23 and the circumferential narrow groove 24 (see FIG. 2). The inner second land portion 32 includes the chamfered portions 321 and the lug grooves 322. The chamfered portions 321 are formed on an edge portion on the tire ground contact edge T side of the inner second land portion 32. The chamfered portions 321 widen the chamfer widths on the road contact surface of the inner second land portion 32 in the tire circumferential direction. The lug grooves 322 terminate in the inner second land portion 32 at one end portions and open to the central portions in the longitudinal direction of the chamfered portions 321 at the other end portions. Additionally, the outer second land portion 34 and the outer shoulder land portion 35 include the closed lug grooves 41. The closed lug grooves 41 terminate in the outer second land portion 34 at one end portions. The closed lug grooves 41 extend in the tire width direction and penetrate the circumferential narrow groove 24. The closed lug grooves 41 terminate in the ground contact surface of the outer shoulder land portion 35 at the other end portions.

In such a configuration, (1) the inner second land portion 32 includes the chamfered portions 321 and the lug grooves 322 formed on the edge portion on the tire ground contact edge T side. This is advantageous in that the drainage properties of the inner second land portion 32 are improved and the wet steering stability performance of the tire is improved. Additionally, (2) the lug grooves 322 in the inner second land portion 32 do not penetrate the land portion 32. This is advantageous in that the rigidity of the inner second land portion 32 is ensured and the dry steering stability performance of the tire is ensured. Additionally, (3) the lug grooves 322 in the inner second land portion 32 open to the central portions in the longitudinal direction of the chamfered portions 321. This is advantageous in that the drainage properties of the inner second land portion 32 are improved and the wet steering stability performance of the tire is improved. Furthermore, (4) the closed lug grooves 41 in the region outer side in the vehicle width direction penetrating the circumferential narrow groove 24 improve the drainage properties at or near the circumferential narrow groove 24 to improve the wet performance of the tire. At the same time, since the closed lug grooves 41 do not open to the circumferential main groove 23 or the tire ground contact edge T, the rigidity of the left and right land portions 34, 35 defined by the circumferential narrow groove 24 is ensured. These have an advantage that the wet performance and dry performance of the tire are efficiently provided in a compatible manner.

Additionally, in the pneumatic tire 10, the maximum width Wc of the chamfered portion 321 has the relationship $0.05 \leq Wc/Wr2 \leq 0.30$ to the ground contact width Wr2 of the inner second land portion 32 (see FIG. 4). This is advantageous in that the lower limit ensures the effect of improving the drainage properties by the chamfered portions 321, and the upper limit ensures the rigidity of the land portion 32.

Additionally, in the pneumatic tire 10, the maximum length Lc (see FIG. 4) in the tire circumferential direction from the maximum width position 3211 to the minimum width position 3212 of the chamfered portion 321 has the relationship $0.60 \leq Lc/Pc \leq 1.00$ to the pitch length Pc (see FIG. 3) of the chamfered portions 321. This has the advantage in that the lower limit ensures the effect of improving the drainage properties by the chamfered portions 321 and the upper limit appropriately sets the planar form of the chamfered portions 321.

Additionally, in the pneumatic tire 10, the chamfered portion 321 has the triangular shape formed by connecting the long portions and the short portion on the road contact surface of the inner second land portion 32 (see FIG. 4). This is advantageous in that the drainage function by the chamfered portions 321 is improved.

Additionally, in the pneumatic tire 10, the extension length D22 in the tire width direction of the lug groove 322 in the inner second land portion 32 has the relationship $0.20 \leq D22/Wr2 \leq 0.80$ to the ground contact width Wr2 of the inner second land portion 32 (see FIG. 4). This is advantageous in that the lower limit ensures the effect of improving the drainage properties by the lug grooves 322 and the upper limit ensures the rigidity of the inner second land portion 32.

Additionally, in the pneumatic tire 10, the maximum groove width W22 of the lug groove 322 in the inner second land portion 32 has the relationship $0.03 \leq W22/Lc \leq 0.10$ to the maximum length Lc in the tire circumferential direction from the maximum width position 3211 to the minimum width position 3212 of the chamfered portion 321 (see FIG. 4). This is advantageous in that the lower limit ensures the effect of improving the drainage properties by the lug grooves 322 and the upper limit ensures the rigidity of the inner second land portion 32.

Additionally, in this pneumatic tire 10, the inclination angle $\theta 22$ of the lug groove 322 in the inner second land portion 32 with respect to the tire circumferential direction is in the range 30 degrees $\leq \theta 22 \leq 85$ degrees (see FIG. 4). This is advantageous in that the inclination angle $\theta 22$ of the lug groove 322 is made appropriate.

Additionally, in the pneumatic tire 10, the distance L22 in the tire circumferential direction from the maximum width position 3211 of the chamfered portion 321 to the opening position of the lug groove 322 to the chamfered portion 321 has the relationship $0.35 \leq L22/Lc \leq 0.65$ to the maximum length Lc in the tire circumferential direction from the maximum width position 3211 to the minimum width position 3212 of the chamfered portion 321 (see FIG. 4). In such a configuration, the lug grooves 322 open to the central portions in the longitudinal direction of the chamfered portion 321. This is advantageous in that drainage effects brought by the combination of the lug grooves 322 and the chamfered portions 321 are further improved.

Additionally, in the pneumatic tire 10, the distance Di (including the minimum value Di_min and the maximum value Di_max of the distance Di in FIG. 8) from the circumferential narrow groove 24 to the terminating end portion on the outer second land portion 34 side of the closed lug groove 41 and the ground contact width Wr4 (see FIG. 7) of the outer second land portion 34 have the relationship $0.10 \leq Di/Wr4 \leq 0.80$. This is advantageous in that the extension lengths Di of the closed lug grooves 41 in the tire width direction in the outer second land portion 34 are made appropriate. In other words, the lower limit ensures the extension length Di of the closed lug grooves 41 in the outer second land portion 34 and ensures the effect of improving the wet performance by the closed lug grooves 41. Additionally, the upper limit suppresses deterioration of the rigidity of the outer second land portion 34 caused by the excessive extension length Di of the closed lug grooves 41.

Additionally, in the pneumatic tire 10, the distance Do (including the minimum value Do_min and the maximum value Do_max of the distance Do in FIG. 8) from the circumferential narrow groove 24 to the terminating end portion on the outer shoulder land portion 35 side of the closed lug groove 41 and the ground contact width Wr5 (see FIG. 7) of the outer shoulder land portion 35 have the relationship $0.10 \leq Do/Wr5 \leq 0.60$. Thus, this is advantageous in that the extension length of the closed lug grooves 41 in the tire width direction in the outer shoulder land portion 35 is made appropriate. In other words, the lower limit ensures the extension length Do of the closed lug grooves 41 in the outer shoulder land portion 35 and ensures the effect of improving the wet performance by the closed lug grooves 41. Additionally, the upper limit suppresses deterioration of the rigidity of the outer shoulder land portion 35 caused by the excessive extension length Do of the closed lug grooves 41.

Additionally, in this pneumatic tire 10, the inclination angle $\theta$ of the closed lug groove 41 with respect to the tire circumferential direction is in the range 55 degrees $\leq \theta \leq 75$ degrees (see FIG. 8). As a result, there is an advantage that the drainage properties of the closed lug grooves 41 are improved, and there is an advantage that the pattern noise of the tire caused by the closed lug grooves 41 is reduced.

Additionally, in this pneumatic tire 10, the groove width W41 of the closed lug groove 41 and the groove width Ws of the circumferential narrow groove 24 have the relationship $0.30 \leq W41/Ws \leq 1.50$. As a result, there is an advantage that the drainage action of the closed lug grooves 41 is properly ensured.

Additionally, in the pneumatic tire 10, the left and right edge portions of the outer side center circumferential main groove 23 have the plane structure without the opening portion of the groove or the sipe (see FIG. 2). In such a configuration, the outer side center circumferential main groove 23 has the edge portions having the plane structure. This is advantageous in that the dry steering stability performance and the noise performance of the tire are improved compared to the edge portions having the opening portion of the groove or the sipe.

Additionally, in the pneumatic tire 10, the inner second land portion 32 includes the narrow grooves 323. The narrow grooves 323 open to the edge portion on the tire equatorial plane CL side of the inner second land portion 32 at the one end portions. The narrow grooves 323 terminate near the maximum width positions 3211 of the chamfered portions 321 or connect to the maximum width positions 3211 at the other end portions. In such a configuration, the lateral groove that opens to the central portion of the chamfered portion 321 is the wider lug groove 322, and the lateral groove that terminates at or opens to the maximum width position 3211 of the chamfered portion 321 is the narrower narrow groove 323, and therefore, the following advantages are provided. That is, (a) this is advantageous in that, compared to the configuration in which all grooves disposed in the inner second land portion 32 are the wider lateral grooves (not illustrated), the rigidity of the inner second land portion 32 is ensured, and the dry performance of the tire is ensured. Additionally, (b) this is advantageous in that, compared to the configuration in which all grooves disposed in the inner second land portion 32 are the narrower narrow grooves or sipes (not illustrated), the drainage properties of the inner second land portion 32 are improved, and the wet steering stability performance of the tire is improved. Additionally, (c) this is advantageous in that, compared to the configuration in which the wider lug grooves open to the maximum width positions of the chamfered portions and the narrower narrow grooves or sipes terminate at or open to the central portions of the chamfered portions (not illustrated), the rigidity of the inner second land portion 32 at the maximum width positions 3211 of the chamfered portions 321 can be ensured while the drainage function from the lug grooves 322 to the chamfered portions 321 is ensured. Thus, the dry steering stability performance and the wet steering stability performance of the tire are provided in a compatible manner.

Additionally, in the pneumatic tire 10, the outer second land portion 34 and the outer shoulder land portion 35 include the plurality of types of the closed lug grooves 41A, 41B having the mutually different extension lengths (see FIG. 2). The extension length L1_min in the tire width direction of the shortest first closed lug groove 41A and the extension length L1_max in the tire width direction of the longest second closed lug groove 41B have the relationship 1.10≤L1_max/L1_min≤3.00. In such a configuration, since the plurality of types of the closed lug grooves 41A, 41B having the mutually different extension lengths are arranged at the predetermined interval in the tire circumferential direction, naturally, the terminating end portions of the closed lug grooves 41A, 41B in at least one land portion (the outer second land portion 34 in FIG. 2) are arranged in the tire circumferential direction while mutually offsetting in the tire width direction. Accordingly, compared to the configuration in which the left and right terminating end portions of the closed lug grooves are disposed with the positions in the tire width direction aligned (not illustrated), the long lug groove portions (the parts on the outer second land portion 34 side of the second closed lug grooves 41B in FIG. 2) are disposed on the road contact surface of one land portion (the second land portion 34 in FIG. 2), and the wider ground contact regions are formed between the adjacent long lug grooves at the same time.

This has an advantage that the wet performance and the dry performance of the tire are efficiently improved.

EXAMPLE

Figure 10:
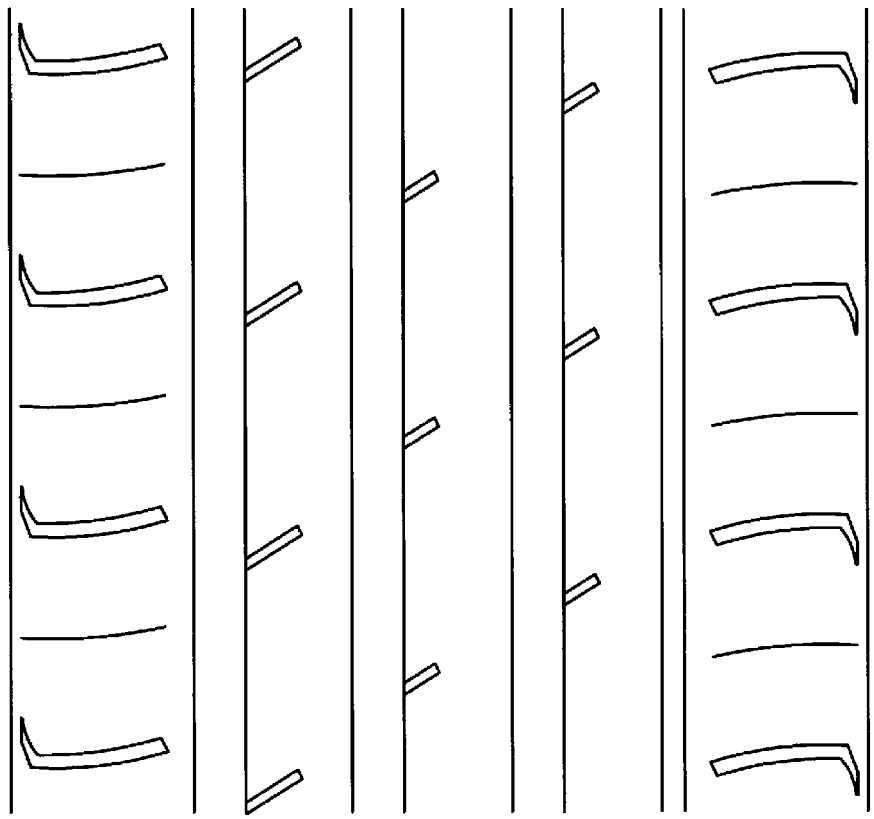
FIG. 10 is an explanatory diagram illustrating a test tire of Conventional Example shown in FIG. 9.

FIG. 9 is a table showing results of performance tests of the pneumatic tires according to the embodiments of the technology. FIG. 10 is an explanatory diagram illustrating a test tire of Conventional Example shown in FIG. 9.

In the performance tests, a plurality of types of pneumatic tires were evaluated for (1) dry steering stability performance and (2) wet steering stability performance. The test tires having a tire size of 245/40R18 97Y are mounted on rims having a rim size of 18×8.5J, and a specified internal pressure and a load specified by JATMA are applied to the test tires. The test tires are mounted on all wheels of the vehicle as the test vehicle.

(1) In the evaluation for dry steering stability performance, the test vehicle runs on a test course of dry road surfaces including a flat circuit at from 60 km/h to 100 km/h. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable. Additionally, it can be said that dry steering stability performance is maintained with the evaluation of 98 or greater.

(2) In the evaluation for wet steering stability performance, the test vehicle runs on a predetermined test course under rainy conditions, and the lap time is measured. The index evaluation is performed based on the measurement results. Results of the evaluation are expressed as index values and evaluated with the Conventional Example being assigned as the reference (100). In this evaluation, larger values are preferable.

The test tires of Examples have the configuration illustrated in FIG. 1 and FIG. 2, and include the three circumferential main grooves 21 to 23 and the circumferential narrow groove 24. The inner second land portion 32 includes the chamfered portions 321 and the lug grooves 322 that open to the central portions of the chamfered portions 321. Additionally, the outer second land portion 34 and the outer shoulder land portion 35 include the plurality of closed lug grooves 41. Additionally, in FIG. 2, the tread width TW is 200 mm, the distance Dg1 from the tire equatorial plane CL to the inner side shoulder main groove 21 is 60.0 mm, the distance Dg2 to the inner side center main groove 22 is 20.0 mm, the distance Dg3 to the outer side center circumferential main groove 23 is 25.0 mm, and the distance Dg4 to the circumferential narrow groove 24 is 60.0 mm. Additionally, the groove width of the circumferential main grooves 21 to 23 is 15.0 mm, and the groove width Ws of the circumferential narrow groove 24 is 5.0 mm. Additionally, the widths Wr1, Wr5 of the shoulder land portions 31, 35 inside and outside are 36.0 mm, and the widths Wr2, Wr4 of the second land portions 32, 34 inside and outside are 27.0 mm. In addition, the pitch length Pc of the chamfered portions 321 is 73 mm, and the pitch count is 30. Also, the arrangement interval P1 of the closed lug grooves 41 and the arrangement interval P2 of the shoulder lug grooves 42 have the relationship P1/P2=0.50.

The test tire of Conventional Example has the configuration illustrated in FIG. 10, and the configurations of the inner second land portion 32, the outer second land portion 34, and the outer shoulder land portion 35 differ from those of the test tire of Example 1.

As can be seen from the test results, it is found that the test tires of Example provide the dry steering stability performance and the wet steering stability performance of the tire in a compatible manner.

The invention claimed is:

1. A pneumatic tire that has a designation of a mounting direction to a vehicle, the pneumatic tire, comprising:
    an inner side shoulder main groove and an inner side center main groove disposed in a region inner side in a vehicle width direction demarcated by a tire equatorial plane;
    an outer side center main groove disposed in a region outer side in the vehicle width direction;
    a circumferential narrow groove disposed outward of the outer side center main groove in the vehicle width direction;
    an inner shoulder land portion and an inner second land portion defined by the inner side shoulder main groove and the inner side center main groove;
    an outer second land portion and an outer shoulder land portion defined by the outer side center main groove and the circumferential narrow groove;
    the inner second land portion comprising chamfered portions and lug grooves, the chamfered portions being formed on an edge portion on a tire ground contact edge side of the inner second land portion, the chamfered portions widening chamfer widths on a road contact surface of the inner second land portion in a tire circumferential direction, the lug grooves terminating in the inner second land portion at one end portions and open to central portions in a longitudinal direction of the chamfered portions at another end portions; and
    the outer second land portion and the outer shoulder land portion comprising closed lug grooves, the closed lug grooves terminating in the outer second land portion at one end portions, the closed lug grooves extending in the tire width direction and penetrating the circumferential narrow groove, the closed lug grooves terminating in a ground contact surface of the outer shoulder land portion at another end portions.

2. The pneumatic tire according to claim 1, wherein a maximum width We of the chamfered portions has a relationship 0.05≤Wc/Wr2≤0.30 to a ground contact width Wr2 of the inner second land portion.

3. The pneumatic tire according to claim 1, wherein a maximum length Lc in the tire circumferential direction from a maximum width position to a minimum width position of the chamfered portions has a relationship $0.60 \leq Lc/Pc \leq 1.00$ to a pitch length Pc of the chamfered portions.

4. The pneumatic tire according to claim 1, wherein the chamfered portions have a triangular shape formed by connecting long portions and a short portion on the road contact surface of the inner second land portion.

5. The pneumatic tire according to claim 1, wherein an extension length D22 in the tire width direction of the lug grooves in the inner second land portion has a relationship $0.20 \leq D22/Wr2 \leq 0.80$ to a ground contact width Wr2 of the land portion.

6. The pneumatic tire according to claim 1, wherein a maximum groove width W22 of the lug grooves in the inner second land portion has a relationship $0.03 \leq W22/Lc \leq 0.10$ to a maximum length Lc in the tire circumferential direction from a maximum width position to a minimum width position of the chamfered portions.

7. The pneumatic tire according to claim 1, wherein an inclination angle θ22 of the lug grooves in the inner second land portion with respect to the tire circumferential direction is in a range 30 degrees $\leq \theta 22 \leq 85$ degrees.

8. The pneumatic tire according to claim 1, wherein a distance L22 in the tire circumferential direction from a maximum width position of the chamfered portions to an opening position of the lug grooves to the chamfered portions has a relationship $0.35 \leq L22/Lc \leq 0.65$ to a maximum length Lc in the tire circumferential direction from the maximum width position to a minimum width position of the chamfered portions.

9. The pneumatic tire according to claim 1, wherein a distance Di from the circumferential narrow groove to a terminating end portion on an outer second land portion side of the closed lug grooves and a ground contact width Wr4 of the outer second land portion have a relationship $0.10 \leq Di/Wr4 \leq 0.60$.

10. The pneumatic tire according to claim 1, wherein a distance Do from the circumferential narrow groove to a terminating end portion on the outer shoulder land portion side of the closed lug grooves and a ground contact width Wr5 of the shoulder land portion have a relationship $0.10 \leq Do/Wr5 \leq 0.60$.

11. The pneumatic tire according to claim 1, wherein an inclination angle θ of the closed lug grooves with respect to the tire circumferential direction is in a range 50 degrees $\leq \theta \leq 80$ degrees.

12. The pneumatic tire according to claim 1, wherein a groove width W41 of the closed lug grooves and a groove width Ws of the circumferential narrow groove have a relationship $0.30 \leq W41/Ws \leq 1.50$.

13. The pneumatic tire according to claim 1, wherein left and right edge portions of the outer side center main groove have a plane structure without an opening portion of a groove or a sipe.

14. The pneumatic tire according to claim 1, wherein the inner second land portion comprises narrow grooves, the narrow grooves open to an edge portion on a tire equatorial plane side of the inner second land portion at one end portions, and the narrow grooves terminate near maximum width positions of the chamfered portions or connect to the maximum width positions at another end portions.

15. The pneumatic tire according to claim 1, wherein
the outer second land portion and the outer shoulder land portion comprise a plurality of types of the closed lug grooves having mutually different extension lengths, and
an extension length L1 min in the tire width direction of a shortest first closed lug groove and an extension length L1 max in the tire width direction of a longest second closed lug groove have a relationship $1.10 \leq L1\,max/L1\,min \leq 3.00$.

* * * * *